US010390086B2

(12) United States Patent
Louboutin

(10) Patent No.: US 10,390,086 B2
(45) Date of Patent: Aug. 20, 2019

(54) INTERACTION RECOGNITION OF A TELEVISION CONTENT INTERACTION DEVICE

(71) Applicant: Roku, Inc., Los Gatos, CA (US)

(72) Inventor: Sylvain René Yves Louboutin, Sunnyvale, CA (US)

(73) Assignee: ROKU, INC., Los Gatos, CA (US)

(*) Notice: Subject to any disclaimer, the term of this patent is extended or adjusted under 35 U.S.C. 154(b) by 0 days.

(21) Appl. No.: 15/830,689

(22) Filed: Dec. 4, 2017

(65) Prior Publication Data
US 2018/0131997 A1    May 10, 2018

Related U.S. Application Data

(63) Continuation of application No. 15/348,592, filed on Nov. 10, 2016, now Pat. No. 9,866,904.

(51) Int. Cl.
| | |
|---|---|
| *H04N 21/442* | (2011.01) |
| *H04N 21/422* | (2011.01) |
| *H04N 21/4223* | (2011.01) |
| *H04N 21/8547* | (2011.01) |
| *G06F 16/683* | (2019.01) |

(52) U.S. Cl.
CPC ..... *H04N 21/44222* (2013.01); *G06F 16/683* (2019.01); *H04N 21/4223* (2013.01); *H04N 21/42203* (2013.01); *H04N 21/42204* (2013.01); *H04N 21/8547* (2013.01)

(58) Field of Classification Search
CPC ....... H04N 21/44222; H04N 21/42203; H04N 21/42204; H04N 21/4223; H04N 21/8547; G06F 17/30743
See application file for complete search history.

(56) References Cited

U.S. PATENT DOCUMENTS

| | | | | |
|---|---|---|---|---|
| 7,690,013 B1* | 3/2010 | Eldering | ................ | G06Q 30/02 725/32 |
| 8,484,677 B1 | 7/2013 | Eldering et al. | | |
| 9,866,904 B1 | 1/2018 | Louboutin | | |
| 2005/0132420 A1* | 6/2005 | Howard | ................... | G06F 3/017 725/135 |
| 2009/0235312 A1* | 9/2009 | Morad | ................... | G06Q 30/02 725/44 |
| 2015/0382047 A1* | 12/2015 | Van Os | ................... | G10L 15/22 725/38 |

(Continued)

OTHER PUBLICATIONS

International Search Report and Written Opinion, dated Sep. 27, 2017, for PCT Appl. No. PCT/US17/50624, filed Sep. 8, 2017, 10 pages.

*Primary Examiner* — Hunter B Lonsberry
(74) *Attorney, Agent, or Firm* — Sterne, Kessler, Goldstein & Fox P.L.L.C.

(57) ABSTRACT

Interaction recognition of a television content interaction device is discussed herein. An embodiment operates by receiving, by at least one processor, interaction data from a receiver, wherein the receiver is configured to receive interaction data; determining, by at least one processor, an interaction from the interaction data; storing, by at least one processor, the determined interaction; selecting, by at least one processor, a content modification based upon the determined interaction; and modifying, by at least one processor, content streamed to the receiver according to the selected content modification.

20 Claims, 7 Drawing Sheets

(56) References Cited

U.S. PATENT DOCUMENTS

| | | | |
|---|---|---|---|
| 2016/0063318 A1* | 3/2016 | Cheatham, III | G06K 9/00335 348/143 |
| 2016/0127765 A1* | 5/2016 | Robinson | H04N 21/4333 725/12 |

* cited by examiner

INTERACTION RECOGNITION OF A TELEVISION CONTENT INTERACTION DEVICE

CROSS REFERENCE TO RELATED APPLICATIONS

This application is a continuation of U.S. patent application Ser. No. 15/348,592, by Louboutin, "Interaction Recognition of a Television Content Interaction Device," filed Nov. 10, 2016, which is hereby incorporated by reference in its entirety.

BACKGROUND

With a rise in technology surrounding the control of broadcast content, new types of interactions may be used to control the broadcast content. With the introduction of these new interactions, new challenges arise. Such challenges include how the interactions are collected, how the interactions interact with a content server, and how to control broadcast content based on these interactions. Today, interaction devices allow for controlling broadcast content at a receiver end. These types of interaction devices may control broadcast content at the receiver according to information sent by the interaction device and received by the receiver.

However, these types of interaction devices and receivers do not allow for the storage of the interactions with the interaction device. Further, the interactions to control broadcast content may only be set at a local level, meaning interactions may control broadcast content differently depending on the interaction device and receiver. Thus, these types of interaction devices and receivers do not allow for control of broadcast content at a server level.

SUMMARY

Provided herein are system, apparatus, article of manufacture, method and/or computer program product embodiments, and/or combinations and sub-combinations thereof, for a distributed smart power and storage transfer architecture.

An embodiment includes a method. The method may include receiving, by at least one processor, interaction data from a receiver, wherein the receiver is configured to receive interaction data. The method may further comprise determining, by at least one processor, an interaction from the interaction data and storing, by at least one processor, the determined interaction. Additionally, the method may also include selecting, by at least one processor, a content modification based upon the determined interaction; and modifying, by at least one processor, content streamed to the receiver according to the selected content modification Another embodiment includes a system that may include a memory located and at least one processor located coupled to the memory. The at least one process may be configured to receive interaction data from a receiver, wherein the receiver is configured to receive interaction data from a plurality of sensors. Further, the at least one processor may further be configured to determine an interaction from the interaction data, store the determined interaction, select a content modification based upon the determined interaction; and modify content streamed to the receiver according to the selected content modification.

A further embodiment includes a tangible, non-transitory computer-readable device having instructions stored thereon that, when executed by at least one computing device, causes the at least one computing device to perform operations. These operations may include receiving interaction data from a receiver, wherein the receiver is configured to receive interaction data, determining an interaction from the interaction data, storing the determined interaction, selecting a content modification based upon the determined interaction; and modifying content streamed to the receiver according to the selected content modification.

BRIEF DESCRIPTION OF THE DRAWINGS

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, method and/or computer program product embodiments, and/or combinations and sub-combinations thereof, for sensory detection of interactions during broadcast content.

Figure 1:
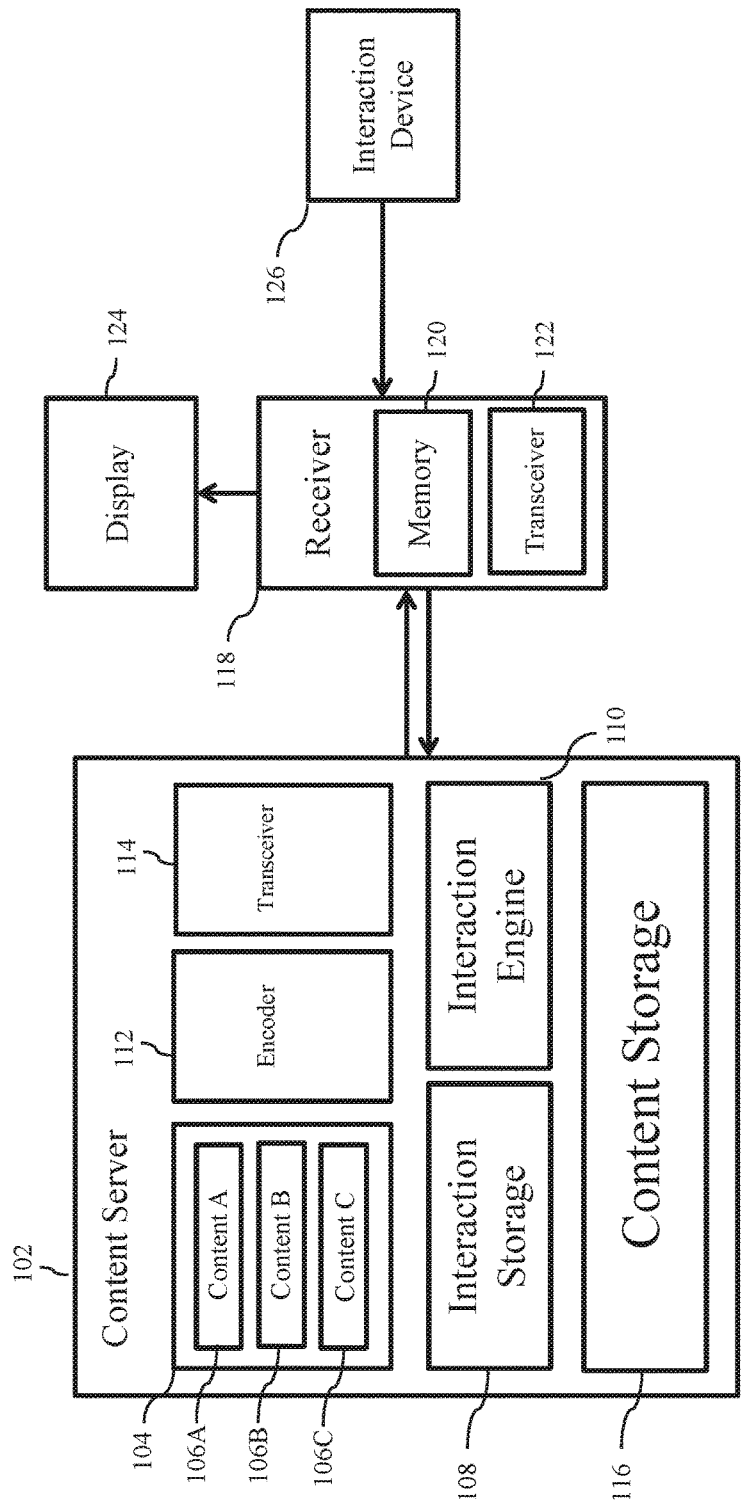
FIG. 1 is a block diagram of a system for sensory detection of interactions during broadcast content, according to some embodiments.

FIG. 1 is a block diagram of a system for sensory detection of interactions during broadcast content, according to some embodiments. According to an embodiment, a system for sensory detections may comprise content server 102, receiver 118, display 124, and interaction device 126. In an embodiment, content server 102 may comprise a plurality of content 106 (comprising content A 106A, content B 106B, and content C 106C), interaction storage 108, interaction engine 110, encoder 112, transceiver 114, and memory 116.

According to an embodiment, content server 102 may broadcast plurality of content 106. In an embodiment, plurality of content 106 may comprise image sources, audio sources, television programs, movies, music, pictures, advertisements, streamable content, internet television, live content, or any combination thereof—to name a few examples. According to an embodiment, plurality of content 106 may be stored in content storage 116. Content storage 116 may comprise random access memory (RAM), read-only memory (ROM), electronically erasable programmable random access memory (EEPROM), hard disk drive (HDD), solid state drive (SSD), or any combination thereof—to name a few examples.

In an embodiment, content server may broadcast plurality of content 106 via transceiver 114. For example, content server 102 may broadcast content A 106A via transceiver 114. According to an embodiment, transceiver 114 may broadcast plurality of content 106 as analog television signals, digital television signals, satellite television signals, analog radio signals, digital radio signals, satellite radio signals, internet video streaming (including dial-up, broadband, fiber, DSL, wireless, mobile network, and satellite internet), internet radio streaming, or any combination thereof—to name a few examples.

According to an embodiment, content server 102 may encode and compress content via encoder 112 before it is broadcast. For example, encoder 112 may encode content 106A before it is broadcast by transceiver 114. In an embodiment, encoder 112 may encode plurality of content 106 by a plurality of encoding and codec systems, such as NTSC, PAL, SECAM, FM, AM, DAB+, DMB, DTMB, ATSC, ISDB, DVB-S, DVB-S2, DVB-C, DVB-T, DTT, MMDS, MVDS, Flash, MPEG-1, MPEG-4, WMV, VP6, RealVideo, Real Audio, FLAC, ALAC, AMR, EVRC, are any combination thereof—to name a few examples.

In an embodiment, plurality of content 106 broadcast via transceiver 114 may be received by receiver 118. Receiver 118 may comprise a radio, cable box, a television antenna, a television, a smart phone, a tablet, a streaming device, a gaming console, or any combination thereof—to name a few examples. According to an embodiment, receiver 118 may comprise transceiver 122 that may receive plurality of content 106 broadcast by transceiver 114.

According to an embodiment, receiver 118 may display plurality of content 106 received from transceiver 114 on display 124. Display 124 may comprise a television, a monitor, a phone screen, a tablet screen, a projector, or any combination thereof—to name a few examples. For example, content 106A may comprise a television program. Receiver 118 may receive content 106A from transceiver 114 and the television program on display 124.

In an embodiment, interaction device 126 may comprise a device to send signals to receiver 116 to manipulate the content displayed on display 124. For example, interaction device 126 may send signals to receiver 116 to control the speed, volume, channel, scene, screen, color, playback, or any combination thereof of the content displayed on display 124—to name a few examples. As a few non-limiting examples, interaction device 126 may comprise a remote control, a smart phone touchscreen, a tablet touchscreen, or any combination thereof. According to an embodiment, interaction device 126 may send signals to receiver 118 via infrared communications, fiber communications, wired communications, WiFi, wireless communications, electromagnetic communications, or any combination thereof—to name a few examples.

According to another embodiment, interaction device 126 may comprise a plurality of sensors that detect interactions with interaction device 126. The plurality of sensors that detect interactions with interaction device 126 may comprise interactive buttons, a microphone, a camera, an angle sensor, a motion sensor, or any combination thereof—to name a few examples. As a non-limiting example, interaction device 126 may comprise a remote control that detects interactions with buttons of the remote control and the angle of the remote control.

In another embodiment, interaction device 126 may comprise a plurality of sensors that monitor the environment and area surrounding interaction device 126. The plurality of sensors that monitor the environment and area surrounding interaction device 126 may comprise a proximity sensor, a light sensor, a camera, a microphone, a proximity sensor, a heat sensor, a motion detector, or any combination thereof—to name a few examples. As a non-limiting example, interaction device 126 may comprise a camera that detects objects in front of interaction device 126.

According to an embodiment, interaction device 126 may send sensor data from its sensors to receiver 118. Interaction device 126 may send data from its sensors from its sensors to receiver 118 via infrared communications, fiber communications, wired communications, WiFi, wireless communications, electromagnetic communications, or any combination thereof—to name a few examples. For example, interaction 126 may comprise a camera and may send data from its camera to receiver 118.

In an embodiment, receiver 118 may store sensor data from interaction device's 126 sensors in memory 120. Memory 120 may comprise RAM, ROM, EEPROM, HDD, SSD, or any combination thereof—to name a few examples. For example, receiver 118 may receive camera sensor data from interaction device 126. Once the data is received, receiver 118 may store the sensor data in memory 120.

According to an embodiment, receiver 118 may send sensor data received from interaction device 126 to content server 102. Receiver 118 may send the data via transceiver 122 to content server 102. Transceiver 122 may transmit the sensor data to content server 102 via fiber communications, wired communications, WiFi, mobile network communications, wireless communications, or any combination thereof—to name a few.

In an embodiment, receiver 118 may send information regarding the content displayed on displayed on display 124. The information regarding the content displayed may comprise the speed, volume, color, resolution, hue, or any combination thereof—to name a few examples—of the content displayed on display 124.

In an embodiment, content server 102 may store received sensor data from receiver 118 in interaction storage 108. Interaction storage 108 may comprise RAM, ROM, EEPROM, HDD, SSD, or any combination thereof—to name a few examples. According to an embodiment, content server 102 may classify sensor data received from receiver 118. The sensor data may be classified by type, timestamp, set thresholds, a grading system, type of interaction device, type of receiver, or any combination thereof—to name a few examples. According to an embodiment, content server 102 may store received information regarding the content displayed in interaction storage 108.

Figure 2:
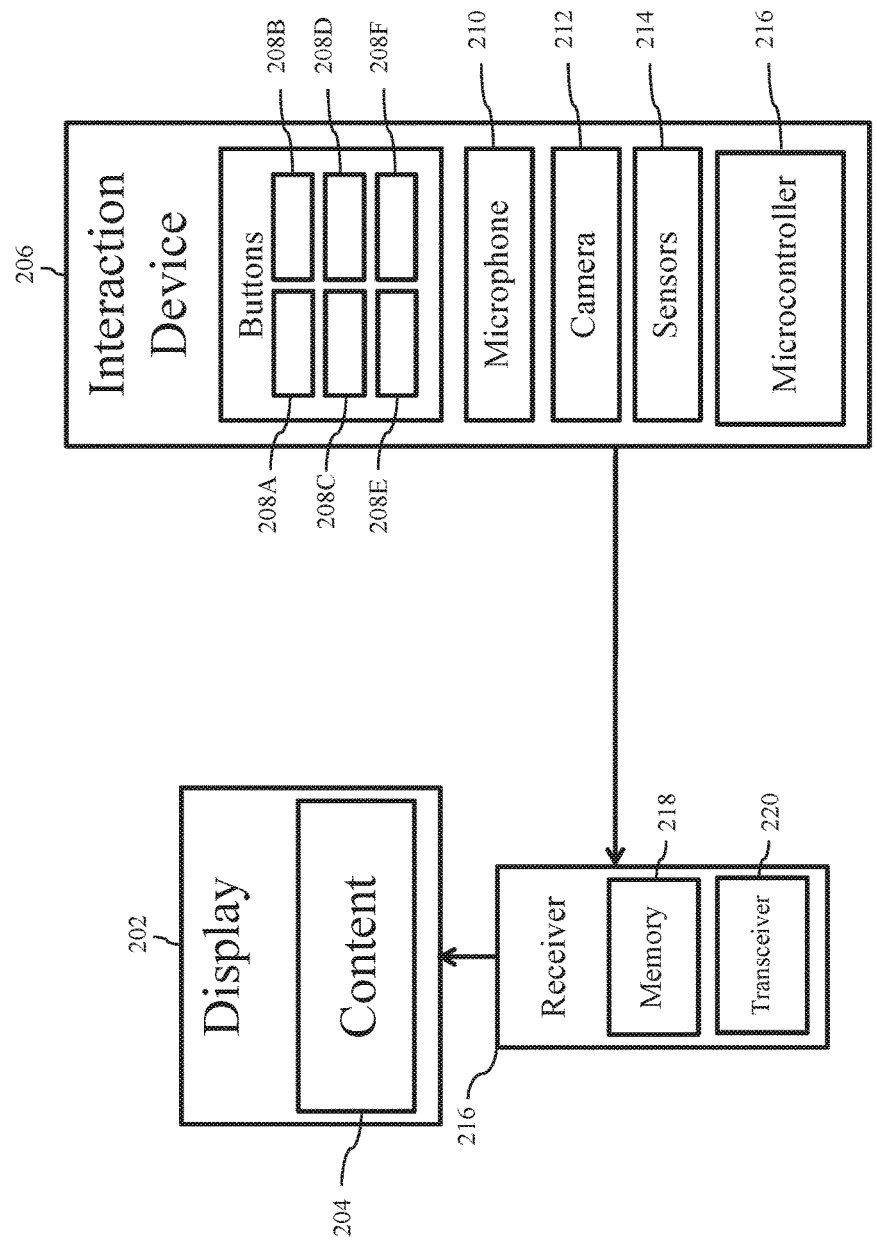
FIG. 2 is a block diagram of interaction device system 200, according to some embodiments.

FIG. 2 is a block diagram of interaction device system 200, according to some embodiments. According to an embodiment, interaction device system 200 may comprise display 202, receiver 216, and interaction device 206. In an embodiment, receiver 216 may display received content 204 on display 202 as discussed in FIG. 1.

In an embodiment, interaction device 206 may comprise a plurality of buttons 208 (comprising button A 208A, button B 208B, button C 208C, button D 208D, button E 208E, and button F 208F), microphone 210, camera 212, plurality of interaction and environmental sensors 214, and microcontroller 216.

According to an embodiment, buttons 208 may comprise interactive buttons. Interactive buttons may comprise push buttons, pressure sensitive buttons, physical buttons, virtual buttons, capacitive buttons, resistive buttons, or any combination thereof—to name a few examples. In an embodiment, buttons 208 may receive interaction inputs as interactions with buttons 208. These interactions may comprise button presses, button taps, button holds, button touches, button swipes, or any combination thereof—to name a few examples. The received interaction input may comprise the type of interaction. For example, button A may receive a hold interaction, button b may receive a tap interaction, and button C may receive a tap interaction.

In an embodiment, each button of buttons 208 may perform a function to manipulate content 204 displayed on display 202. These functions may comprise pause, skip, fast forward, rewind, skip back, stop, volume up, volume down, play, mute, channel up, channel down, or any combination thereof—to name a few examples. For example, button A 208A may pause content 204 when interacted with, button B 208B may play content 204 when interacted with, button C 208C may lower the volume of content 204 when interacted with, and button D 208D may raise the volume of content 204 when interacted with.

According to an embodiment, each button of buttons 208 may perform a function to navigate a user interface displayed on display 202. These functions may comprise selecting text, selecting an image, selecting a menu, enter, scroll up, scroll down, scroll left, scroll right, or any combination thereof—to name a few examples. In an embodiment, the user interface may comprise a navigating the user interface may comprise selecting a movie scene, a song, a feature, a menu, start time for streamed content, or any combination thereof—to name a few.

In an embodiment, microphone 210 may comprise a plurality of microphone types. The plurality of microphone types may comprise a front microphone, a rear microphone, electret microphones, dynamic microphones, condenser microphones, directional microphones, bidirectional microphones, omnidirectional microphones, unidirectional microphones, or any combination thereof—to name a few examples. According to an embodiment, microphone 210 may detect the ambient noise around interaction device 206. Ambient noise may comprise, for example, background noise, voices, music, or any combination thereof—to name a few examples. For example, microphone 210 may detect any voices around interaction device 206.

According to an embodiment, camera 212 may comprise a plurality of camera types. The plurality of camera types may comprise forward-facing cameras, a rear-facing cameras, digital cameras, infrared cameras, CMOS cameras, CCD cameras, wireless cameras, or any combination thereof—to name a few examples. In an embodiment, camera 212 may detect whether an object is in view of camera 212. The object detected may be a person, an obstacle (such as a furniture, doors, walls, ceilings, floors, or any combination thereof—to name some examples), display 202, or any combination thereof—to name a few examples.

In an embodiment, camera 212 may detect an object through background subtraction, Gaussian subtraction, frame differencing, mean filter, or any combination—to name a few.

According to an embodiment, camera 212 may detect the movement of detected objects. Camera 212 may detect the movement of detected object by frame comparisons, trajectory estimations, vector analysis, or any combination thereof—to name a few examples. As a non-limiting example, camera 212 may detect a user's hand in front of camera 212. Camera 212 may further detect that the user's hand is oscillating between two positions, such as, for example, in a "waving" gesture.

In an embodiment, sensors 214 may comprise interaction and detection sensors that detect information as detailed in FIG. 1. For example, sensors 214 may comprise an angle sensor that detects the angle of interaction device 206 from the ground.

According to an embodiment interaction data from buttons 208, microphone 210, camera 212, and plurality of interaction and environmental sensors 214 may be sent to microcontroller 216. Microcontroller 216 may comprise a processor, a CPU, a microprocessor, an FPGA, a PIC, an AVR, or any combination thereof—to name a few examples. In an embodiment, when microcontroller 216 receives interaction data, a timestamp is created and associated with the data. The timestamp may comprise the time, date, content streamed, duration, or any combination thereof—to name a few examples. For example, microcontroller 216 may receive interaction data comprising a button press from buttons 208. Microcontroller 216 may then create a timestamp comprising the time the button press was received, and associate that timestamp with the button press.

Figure 3:
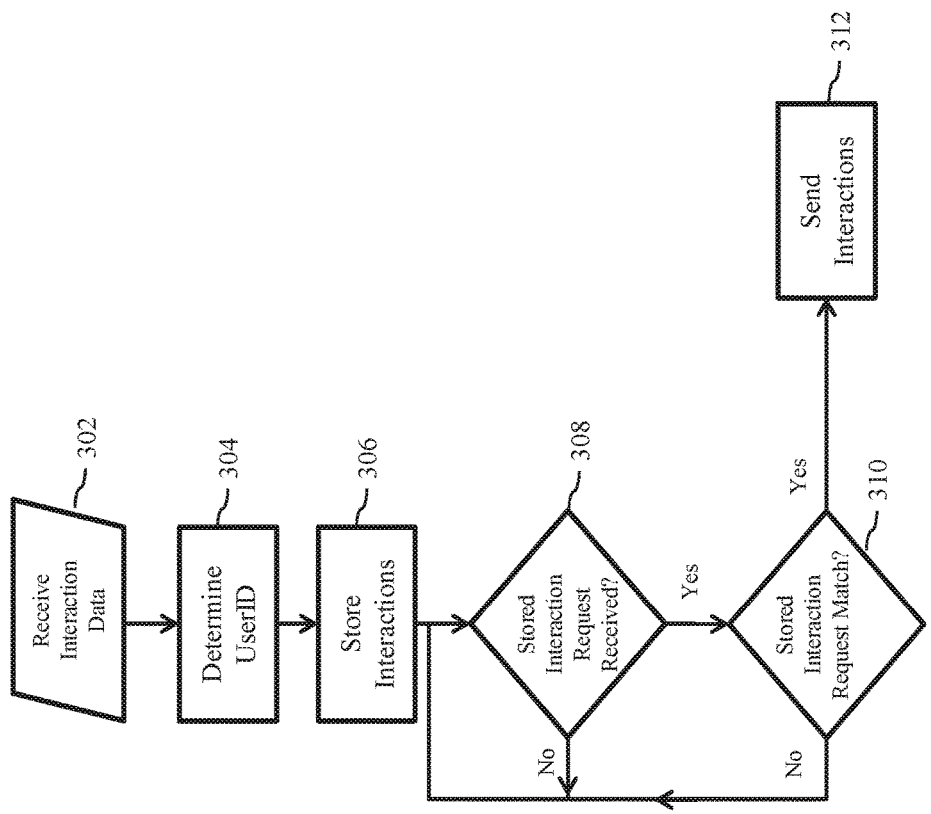
FIG. 3 is a flowchart illustrating a process for storing received interactions, according to some embodiments.

FIG. 3 is a flowchart illustrating a process for storing received interactions, according to some embodiments.

According to an embodiment, at 302, content server 102 may receive interaction data and associated timestamps from receiver 118. Interaction data may comprise interaction with buttons, data from a camera, data from a microphone, data from environmental sensor, data from interaction sensors, data from any other sensor, or any combination thereof. Interaction data and associated timestamps may be sent from interaction device 126 to receiver 118 as detailed in the discussion of FIG. 2.

In an embodiment, at 304, content server 102 may receive userID information from receiver 118. UserID information may comprise a serial number, location, IP address, MAC address, registration data, or any combination thereof—to name a few examples—of receiver 118.

According to an embodiment, at 306, interaction engine 110 may assign interaction data and associated timestamps received from receiver 118 with the userID information of receiver 118 and store the interaction data, associated timestamps, and userID information in interaction storage 108. Associating the data together may comprise storing the data in the same table, storing the data in the same column, creating a pointer, or any combination thereof—to name a few examples. For example, receiver 118 may receive interaction data comprising a number of button interactions from interaction device 126 along with an associated timestamp. Receiver 118 may send the interaction data and timestamp to content server 102 along with userID information comprising the IP address of receiver 118. Interaction engine 110 may store the IP address of receiver 118 and the interaction data in the same table within interaction storage 108.

According to an embodiment, at 308, interaction 110 may determine whether or not content server 102 has received a stored interaction request. The stored interaction request may comprise a request for particular interaction data, particular userID information, timestamps, or any combination thereof—to name a few examples. In an embodiment, the stored interaction request may be received by content server 102 as a query, keyboard strokes, mouse clicks, mouse drags, or any combination thereof—to name a few examples. If content server 102 has received a stored interaction request, then 310 is performed, otherwise 308 is repeated.

In an embodiment, at 310, interaction engine 110 determines whether if the stored interaction request matches any of the interaction data stored in interaction storage 108. For example, content server 102 may receive a stored interaction request comprising data requesting interaction data associated with a specific timestamp. Interaction engine 110 may then determine whether any interaction data associated with the specific timestamp is stored in interaction storage 108. If there is no data stored in interaction storage 108, interaction engine 110 may repeat 308, otherwise interaction engine 110 may perform 312.

In an embodiment, interaction engine 110 may determine whether if the stored interaction request matches any of the interaction data stored in interaction storage 108 by comparing bitmap width, graphs, trees, strings, or any combination thereof—to name a few examples. According to an embodiment, interaction engine 110 may compare graphs, trees, or any combination thereof, through Levenshtein distance, Damerau-Levenshtein distance, longest common sequence, Hamming distance, or any combination thereof—to name a few examples.

According to an embodiment, at 312, interaction 110 may return a result. The result may comprise the data stored in interaction storage 108 that matches the stored interaction request.

Figure 4:
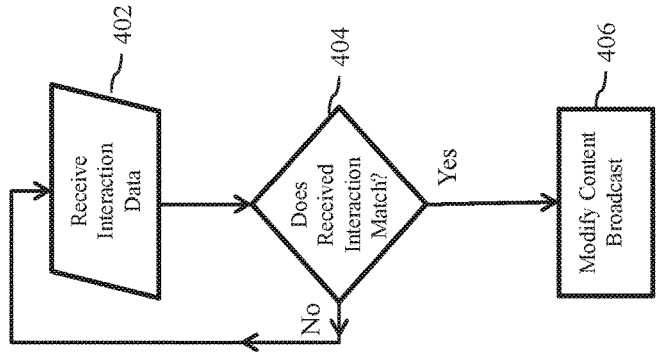
FIG. 4 is a flowchart illustrating a process for modifying broadcast content based upon received interactions, according to some embodiments.

FIG. 4 is a flowchart illustrating a process for modifying broadcast content based upon received interactions, according to some embodiments.

At 402, content server 102 may receive interaction data and associated timestamps as well as information regarding the content displayed on display 124 from receiver 118. Interaction data may comprise interaction with buttons, data from a camera, data from a microphone, data from environmental sensor, data from interaction sensors, or any combination thereof. Interaction data and associated timestamps may be sent from interaction device 126 to receiver 118 as detailed in the discussion of FIG. 2.

At 404, interaction engine 110 may determine if the received interaction data matches any interaction data from a stored list of modifying interactions. The stored list of modifying interactions may comprise tables, columns, lists, vectors, rows, or any combination thereof—to name a few examples—of interactions associated with content 106 being broadcast by content server 102. For example, the stored list of modifications may comprise button interactions, button interaction rhythms, button functions, user interface navigations, songs, music, gestures, facial expressions, background objects, environmental sensor data, interaction sensor data, background data, or any combination thereof—to name a few examples—associated with content 106 being broadcast. Interaction engine 110 may determine that received interaction data matches a modifying interaction from the stored list of modifying interactions, in which case the system moves on to 406, otherwise 402 is repeated. For example, content server 102 may receive interaction data comprising an interaction with a button to perform the volume down function while content A 106A is being broadcast. Interaction engine 110 may then compare the received interaction data to the stored list of modifying interactions associated with content A 106A, which may comprise an interaction with a button to perform the volume down function. When interaction engine 110 matches the received interaction data to the stored list of modifying interactions associated with content A 106A, the system may perform 406.

According to an embodiment, content server 102 may receive interaction data that comprises button interactions and timestamps. For example, content server 102 may receive interaction data comprising button A 208A pressed at timestamp A, button B 208B pressed at timestamp B, button A 208A pressed at timestamp C, and button D 208D pressed at timestamp D. In an embodiment, interaction engine 110 may determine a rhythm the buttons were interacted with through use of the associated timestamps. Interaction engine 110 may further match the determined rhythm to a rhythm from the stored list of modifying interactions.

According to an embodiment, content server 102 may receive interaction data that comprises timestamps and button interactions comprising user interface navigations. For example, content server 102 may receive interaction data comprising an interaction with button A 208A, comprising selecting a scene, at timestamp A, an interaction with button B 208B comprising starting a scene, at timestamp B, and an interaction with button A 208, comprising selecting the scene, at timestamp C. In an embodiment, interaction engine 110 may determine a history of scene selection through use of the associated timestamps. Interaction engine 110 may further match the determined history of scene selection to a history of scene selections from the stored list of modifying interactions.

In an embodiment, content server 102 may receive interaction data that comprises ambient noise received by microphone 210 and a timestamp. For example, content server 102 may receive interaction data comprising ambient noise received by microphone 210 at timestamp A. According to an embodiment, interaction engine 110 may determine whether the ambient noise matches a specific song or piece of music. Interaction engine 110 may make this determination by comparing the ambient noise to a music database, using a music recognition software, sending the ambient noise to a music recognition engine, comparing the ambient noise to stored sound files, or any combination thereof—to name a few examples. In an embodiment, interaction engine 110 may further match the determined song or music from the ambient noise to a song or piece of music from the stored list of modifying interactions.

According to another embodiment, interaction engine 110 may determine whether the ambient noise matches a specific voice line or phrase. Interaction engine 110 may make this determination by comparing the ambient noise to data from a database, sending the ambient noise to a speech recognition engine, using a speech recognition software, using a speech-to-text software, or any combination thereof—to name a few examples. In an embodiment, interaction engine 110 may further match the determined voice line or phrase to a voice line or phrase from the stored list of modifying interactions.

According to an embodiment, content server 102 may receive interaction data that comprises an image or video received from camera 212 and a timestamp. For example, content server 102 may receive interaction data comprising an image from camera 212. In an embodiment, interaction engine 110 may determine whether the object in an image comprises a face. Interaction engine 110 may make this determination through the use of background filtering, facial recognition software, a facial recognition engine, principal component analysis, linear discriminate analysis, elastic bunch graph matching, or any combination thereof—to name a few examples. In an embodiment, interaction engine 110 may further match the presence of a face in the image to the requirement of a face in front of an interaction device from the stored list of modifying interactions.

In another embodiment, interaction engine 110 may determine facial expressions of a face present in a received image or video from camera 212. Interaction engine 110 may make this determination through the use of background filtering, facial recognition software, a facial recognition engine, principal component analysis, linear discriminate analysis, elastic bunch graph matching, or any combination thereof—to name a few examples. In an embodiment, interaction engine 110 may further match the determined facial expression from the received image or video to facial expressions from the stored list of modifying interactions.

According to an embodiment, content server 102 may receive interaction data that comprises an orientation of the interaction device and a timestamp. For example, content server 102 may receive interaction data comprising a first angle the interaction device is oriented at timestamp A, a second angle at timestamp B, and a third angle at timestamp C. In an embodiment, interaction engine 110 may determine a gesture being made with the interaction device through the angles and associated timestamps. For example, based on the timing of the timestamps and the change in the angles, interaction engine 110 may determine that a waving gesture is being made with the interaction device. Interaction 110 may further match the determined gesture to a gesture from the stored list of modifying interactions.

At 406, interaction engine 110 may modify the content streamed by content sever 102 based upon which interaction from the stored list of modifying interactions was matched. Modifying the content may comprise rewinding the content, speeding up the content, changing the resolution of the content, changing the volume of the content, stopping the content, pausing the content, playing the content, skipping to another portion of the content, selecting new content to play, or any combination thereof—to name a few examples. In an embodiment, each interaction from the stored list of modifying interactions may comprise an associated content modification.

For example, content server 102 may receive interaction data that comprises button interactions and timestamps. From these button interactions and timestamps, interaction engine 110 may determine a rhythm that matches a rhythm from the stored list of modifying interactions. The matched rhythm from the stored list of modifying interactions may be associated with a content modification comprising stopping the content.

In an embodiment, modifying the content may comprise broadcasting new content. For example, content server 102 may be broadcasting content A 106A to receiver 118 when content server 102 receives interaction data comprising ambient noise received by microphone 210. Interaction engine 110 may then match the received ambient noise to a song from the stored list of modifying interactions. Further, the song from the stored list of modifying interactions may be associated with broadcasting new content. Based on this match, interaction engine 110 may end the broadcast of content A 106A to receiver 118, and begin broadcasting content B 106B to receiver 118.

Figure 5:
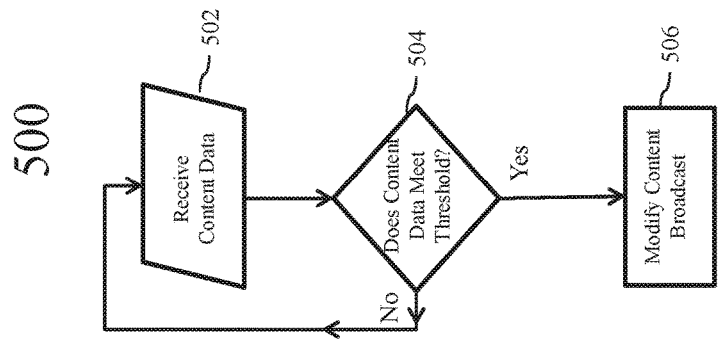
FIG. 5 is a flowchart illustrating a process for modifying broadcast content based upon received content data, according to some embodiments.

FIG. 5 is a flowchart illustrating a process for modifying broadcast content based upon received content data, according to some embodiments.

At 502, content server 102 may receive content data regarding the content displayed on display 126 from receiver 118. The content data may comprise the speed, volume, color, resolution, hue, or any combination thereof—to name a few examples—of the content displayed on display 124. Content server 102 may receive the content data from receiver 118 as detailed in the discussion of FIG. 2.

At 504, interaction engine 110 may compare the received content data to thresholds from a stored list of content thresholds. The stored list of content thresholds may comprise upper and lower threshold value regarding volume, resolution, color, hue, or any combination thereof—to name a few examples. If values from the content data are greater than the respective upper threshold or lower than the respective lower threshold, then the system moves on to 506. Otherwise, 502 is repeated.

As a non-limiting example, content server 102 may receive content data comprising the volume, speed, and resolution of content displayed on display 124. Interaction engine 110 may then compare the volume, speed, and resolution of the content displayed to the upper and lower thresholds for volume, speed, and resolution from the stored list of content thresholds. Interaction engine 110 may then determine that the volume of the content displayed falls below the lower threshold for volume from the stored list of content thresholds.

At 506, interaction engine 110 may modify the content streamed by content sever 102 based upon which threshold from the stored list of content thresholds was exceeded. Modifying the content may comprise rewinding the content, speeding up the content, changing the resolution of the content, changing the volume of the content, stopping the content, pausing the content, playing the content, or any combination thereof—to name a few examples. In an embodiment, each threshold from the stored list of content thresholds may comprise an associated content modification.

For example, content server 102 may receive content data that comprises a volume. Interaction engine 110 may then that the received volume falls below the lower threshold for volume from the stored list of content thresholds. The lower threshold for volume from the stored list content thresholds may be associated with a content modification comprising pausing the content.

Figure 6:
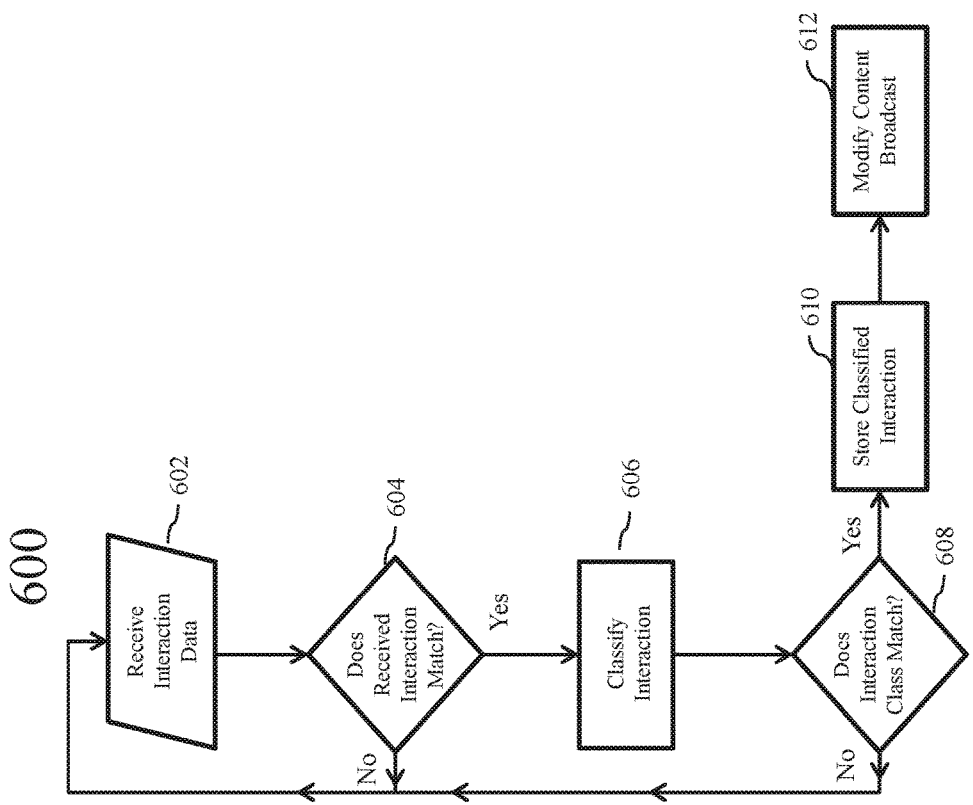
FIG. 6 is a flowchart illustrating a process for detecting an interaction class, according to some embodiments.

FIG. 6 is a flowchart illustrating a process for detecting an interaction class, according to some embodiments.

At 602, content server 102 may receive interaction data and associated timestamps as well as information regarding the content displayed on display 124 from receiver 118. Interaction data may comprise interaction with buttons, data from a camera, data from a microphone, data from environmental sensor, data from interaction sensors, or any combination thereof. Interaction data and associated timestamps may be sent from interaction device 126 to receiver 118 as detailed in the discussion of FIG. 2.

At 604, interaction engine 110 may match the received interaction data to the stored list of modifying interactions as detailed in FIG. 4. If the received interaction data matches interactions from the list of modifying interactions then the system moves to 606, otherwise 602 is repeated. At 606, interaction engine 110 may classify the received interaction data. Classifying the received interaction data may comprise assigning the interaction data a type, assigning a grade to the interaction, sorting the interaction into content played, or any combination thereof—to name a few examples.

In an embodiment, interaction engine 110 may assign the received interaction data a type. The type may comprise a button interaction, a song, an object in an image, a gesture, a phrase, a functionality of a button, or any combination thereof—to name a few examples. For example, the received interaction data may comprise a plurality of button interactions. Interaction engine 110 may then assign the type "button interactions" to the received interaction data.

According to an embodiment, a grade may be assigned to the received interaction data based on the matched interaction from the stored list of modifying interactions. In an embodiment, each interaction from the stored list of modifiable may comprise a grade. The grade may be based on the frequency the interaction is received by content server 102, the type of interaction, the complexity of the interaction, or any combination thereof—to name a few examples.

In an embodiment, the received interaction data may be assigned a class based on the content being broadcast while the interaction was received. For example, the received interaction data may be received while content A 106A is being broadcast and comprise a plurality of button interactions. Interaction engine 110 may then assign the a class to the plurality of button interactions based on the data being received while content A 106A was being broadcast.

At 608, interaction engine 110 determines if the class assigned to the received interaction data matches a class from the stored list of modifying classes. The stored list of modifying classes may comprise types, grades, content groups, or any combination thereof, with each comprising a respective content modification. The respective content modification may comprise rewinding, speeding up, changing the resolution, changing the volume stopping, pausing, playing, or any combination thereof—to name a few examples—of the content streamed. If the assigned class matches a class from the stored list of modifying classes then the system moves to 610, otherwise 602 is repeated.

At 610, the received interaction data and its assigned class is stored in interaction storage 108. At 612, the content streamed by content server 102 is modified according to the respective content modification of the assigned class. For example, content server 102 may receive interaction data that is assigned a class. This class may comprise a content modification of stopping the content. Interaction engine 110 may then stop the content being broadcast by content server 102.

This is all good, but I think you need to add a couple of real life use cases

Figure 7:
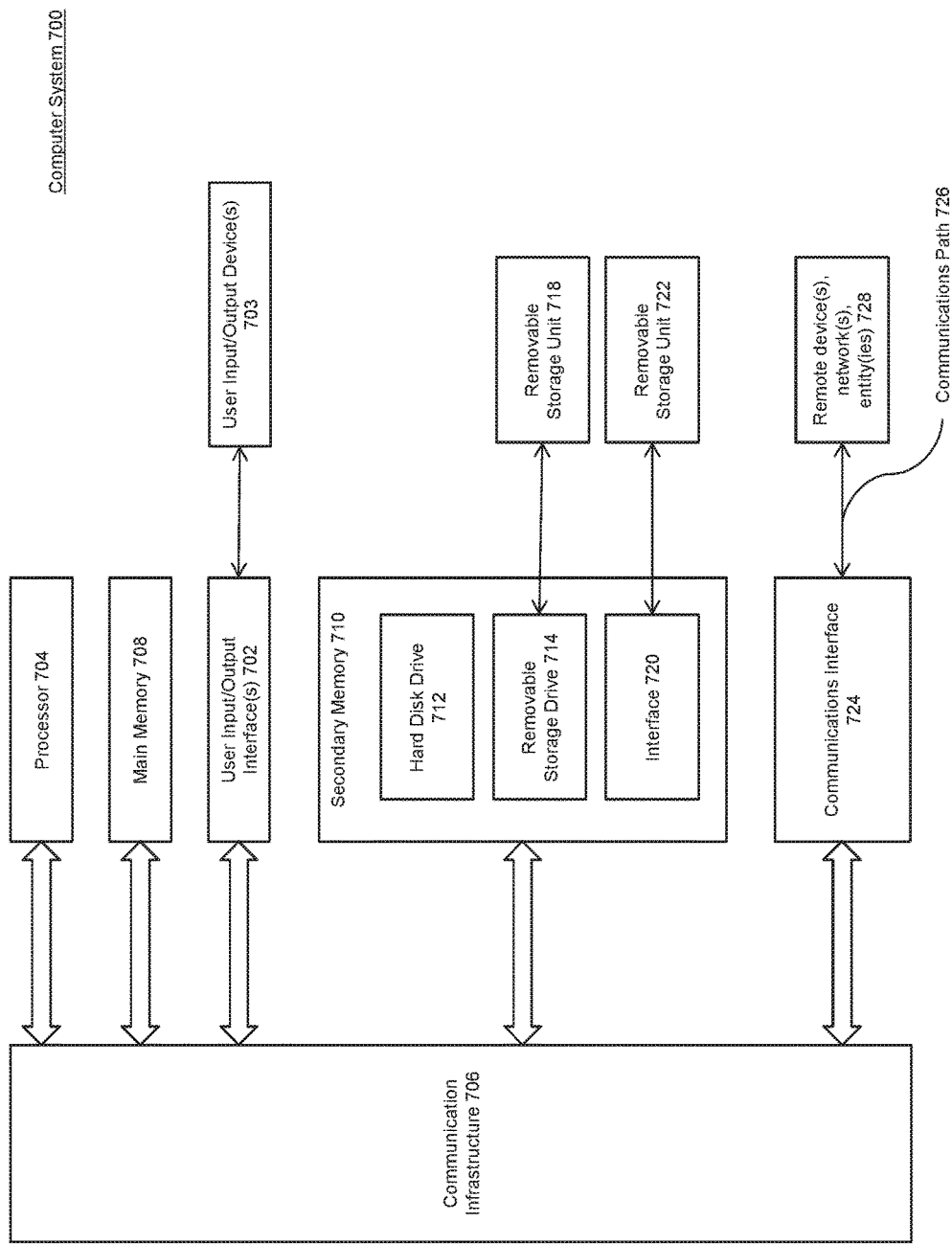
FIG. 7 is an example computer system useful for implementing various embodiments.

Various embodiments can be implemented, for example, using one or more well-known computer systems, such as computer system 700 shown in FIG. 7. For example, computer system 700 can compare received interaction data to a stored list of modifying interactions. Computer system 700 can further modify content that is broadcast based on received interaction data. Computer system 700 can be any computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 608 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 7. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, blocks, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
receiving, by at least one processor of a receiver, interaction data from a sensory device during a streaming of content, wherein the interaction data does not originate from a user operating a remote control;
assigning a grade to the received interaction data based on a frequency indicating how often the interaction data is received;
comparing the received interaction data against stored interaction data associated with the grade, wherein the stored interaction data corresponds to a modification of the streaming content corresponding to the received interaction data;
selecting the content modification based on the comparison; and
modifying, by at least one processor, the streaming content to the receiver according to the selected content modification.

2. The method of claim 1, wherein the received interaction data comprises a song detected by a microphone on the remote control.

3. The method of claim 2, wherein the comparing comprises:
determining that the song matches a content modification for modifying the streamed content being provided to the receiver.

4. The method of claim 3, wherein the content modification comprises one of pausing the content or changing a volume of the content.

5. The method of claim 1, wherein the receiving comprises:
detecting, from a heat sensor associated with the remote control, a temperature of a room where the user is located, wherein the interaction data comprises the temperature.

6. The method of claim 5, wherein the modifying comprises:
modifying the content based on the detected temperature.

7. The method of claim 1, wherein the receiving comprises:
detecting, from a light sensor associated with the remote control, a lighting of a room where the user is located, wherein the interaction data comprises the lighting; and
modifying the content based on the detected lighting.

8. The method of claim 1, wherein the selected content modification comprises one of rewinding, speeding up, or changing a resolution of the streaming content.

9. The method of claim 1, wherein the assigning comprises:
assigning the grade based on a button interaction rhythm.

10. A method, comprising:
receiving, by at least one processor of a receiver, interaction data from a sensory device during a streaming of content, wherein the interaction data does not originate from a user operating a remote control;
assigning a grade to the received interaction data based on a frequency indicating how often the interaction data is received;
comparing the received interaction data against stored interaction data associated with the grade, wherein the stored interaction data corresponds to a modification of the streaming content corresponding to the received interaction data;
selecting the content modification based on the comparison; and
modifying, by at least one processor, the streaming content to the receiver according to the selected content modification.

11. The method of claim 10, wherein the receiving comprises receiving an image from the camera, and detecting an object within the image.

12. The method of claim 11, wherein the comparing comprises:
comparing the object against the stored interaction data; and
determining, based on the comparing, that the object corresponds to a modification of the content.

13. The method of claim 11, wherein the object is a face.

14. The method of claim 13, wherein the object is a facial expression, wherein different facial expressions correspond to different modifications.

15. The method of claim 10, wherein the receiving comprises receiving a hand gesture from the camera, wherein the received interaction comprises the hand gesture.

16. A system, comprising:
a memory; and
at least one processor coupled to the memory and configured to:
receive interaction data, by a receiver, from a sensory device associated with a remote control during a streaming of content;
assign a grade to the received interaction data based on a frequency indicating how often the interaction data is received;
compare the received interaction data against stored interaction data associated with the grade;
determine whether the interaction data originates from a user operating the remote control;
determine a content modification corresponding to the received interaction data; and
modify the streaming content to the receiver according to the selected content modification.

17. The system of claim 16, wherein the interaction data comprises a song, and wherein the content modification corresponds to the song.

18. The system of claim 16, wherein the interaction data comprises a facial expression, and wherein the content modification corresponds to the facial expression.

19. The system of claim 16, wherein the interaction data comprises an object detected from an image.

20. The system of claim 16, wherein the interaction data comprises one of a lighting or a temperate of a room where the remote control is located.

\* \* \* \* \*